(12) United States Patent
Siame et al.

(10) Patent No.: US 7,815,163 B2
(45) Date of Patent: Oct. 19, 2010

(54) DESIGN OF A NOISE SUPPRESSION WEDGE FOR A BUTTERFLY OUTFLOW VALVE

(75) Inventors: Chibuya K. Siame, Tucson, AZ (US); Steven D. Carter, Oro Valley, AZ (US); Christopher L. Thomas, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 812 days.

(21) Appl. No.: 11/692,845

(22) Filed: Mar. 28, 2007

(65) Prior Publication Data

US 2008/0237515 A1   Oct. 2, 2008

(51) Int. Cl.
*F16K 1/22* (2006.01)
(52) U.S. Cl. ..................... 251/121; 251/305
(58) Field of Classification Search .......... 251/118, 251/120, 121, 305, 306, 307, 308
See application file for complete search history.

(56) References Cited

U.S. PATENT DOCUMENTS

| | | | | |
|---|---|---|---|---|
| 3,238,955 A | * | 3/1966 | Lassiter, Jr. | 251/118 |
| 3,298,677 A | * | 1/1967 | Anderson | 251/305 |
| 3,960,177 A | * | 6/1976 | Baumann | 251/305 |
| 4,243,203 A | * | 1/1981 | Mack | 251/305 |
| 5,465,756 A | * | 11/1995 | Royalty et al. | 251/305 |
| 5,881,995 A | | 3/1999 | Tse et al. | |
| 6,116,541 A | | 9/2000 | Chuang et al. | |
| 6,338,468 B1 | | 1/2002 | Ogawa et al. | |
| 6,354,267 B1 | * | 3/2002 | Kotchi et al. | 251/305 |
| 6,824,119 B2 | * | 11/2004 | Conley et al. | 251/305 |
| 7,077,383 B1 | * | 7/2006 | Dreisilker et al. | 251/305 |
| 2006/0214128 A1 | * | 9/2006 | Horner et al. | 251/305 |

FOREIGN PATENT DOCUMENTS

| | | |
|---|---|---|
| EP | 1065361 A | 1/2001 |
| EP | 1408263 A | 4/2004 |
| EP | 1705409 A | 9/2006 |
| GB | 2381043 A | 4/2003 |
| JP | 2001-020761 | 1/2001 |
| WO | WO 02/14721 A | 2/2002 |

OTHER PUBLICATIONS

European Search Report dated Dec. 3, 2009.

* cited by examiner

*Primary Examiner*—John Bastianelli
(74) *Attorney, Agent, or Firm*—Oral Caglar, Esq.

(57) ABSTRACT

A noise suppression wedge for a butterfly valve comprises a wedge-shaped structure having a plurality of fingers and a plurality of slots. The noise suppression wedge is positioned in contact with the butterfly plate and reduces noise by disrupting the flow through the valve.

10 Claims, 6 Drawing Sheets

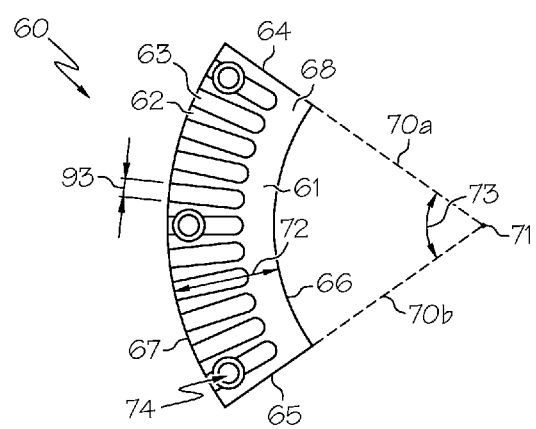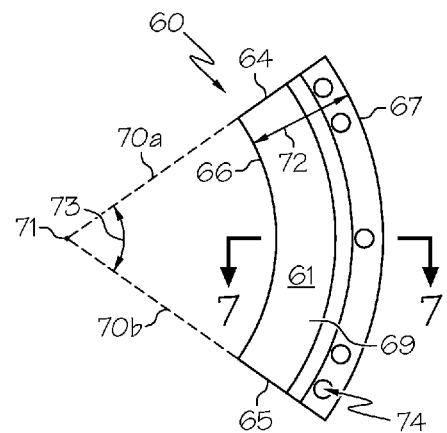
FIG. 5
FIG. 6

DESIGN OF A NOISE SUPPRESSION WEDGE FOR A BUTTERFLY OUTFLOW VALVE

BACKGROUND OF THE INVENTION

The present invention generally relates to butterfly valves and, more particularly, to noise suppression wedges for butterfly outflow valves.

Many aircraft include a cabin pressure control system to control the cabin pressure. Cabin pressure control systems may have one or more outflow valves to assist in controlling cabin pressure by regulating air flow out of the cabin. One type of outflow valve that may be used in cabin pressure control systems is a butterfly valve.

A conventional butterfly valve 30 is depicted in FIG. 1. The prior art butterfly valve 30 comprises a disk 31 positioned within a bore 32 of a housing 33. The disk 31 can be rotated about an axis defined by a shaft 34 in order to control a flow of fluid, such as air (not shown) through the bore 32. The disk 31 may include a ring and seal assembly 35 to reduce leakage when the valve 30 is in a closed position. When the butterfly valve 30 is in an open position, the fluid flow may result in vibration or noise.

A butterfly valve with low noise has been disclosed in U.S. Pat. No. 6,338,468. The described butterfly valve includes an enlarged section of piping immediately downstream of the valve seat so as to control or suppress the noise. The enlarged section of piping has a diameter that is larger than the diameter of the valve disk. Although the described butterfly valve may reduce noise, it requires a section of downstream piping that is not included in some applications. Additionally, the butterfly valve of patent '468 may be most suitable for use with liquid flows, such as slurry.

A noise attenuating device for butterfly valves is disclosed in U.S. Pat. No. 5,881,995. The described butterfly valve includes a first series of elongated members extending from the upstream side of the disk and a second series of generally diametrically opposed elongated members extending from the downstream side of the disk. There may be three or more elongated members on each side of the disk. Each elongated member comprises a tab. One end of the tab is secured to the disk and the other end of the tab is bent to provide an angle between the tab and the surface of the disk. Although the tabs may reduce noise, each tab must be secured to the disk by means such as rivets or welding. The need to position and secure six of more tabs (three or more per side) to the disk increases manufacturing time.

As can be seen, there is a need for improved butterfly valves having noise suppression. Further, a noise suppression device is needed that does not require downstream piping. Additionally, there is a need for noise suppression devices that are easy to manufacture and install.

SUMMARY OF THE INVENTION

In one aspect of the present invention, an apparatus for a butterfly plate comprises a wedge-shaped structure having a flow facing side and a plate facing side, the plate facing side conforming to at least a portion of a surface of the butterfly plate; and at least one slot extending from the flow facing side and extending towards the plate facing side.

In another aspect of the present invention, an apparatus for a butterfly outflow valve comprises a wedge-shaped structure having at least one finger and at least one slot, said slot extending from a flow facing side of said wedge-shaped structure and towards a plate facing side of said wedge-shaped structure, said wedge-shaped structure having a radially inner edge and a radially outer edge.

In a further aspect of the present invention, an apparatus comprises a butterfly plate having an upstream side and a downstream side; and a wedge-shaped structure positioned on said upstream side, said wedge-shaped structure including a plurality of fingers and a plurality of slots.

These and other features, aspects and advantages of the present invention will become better understood with reference to the following drawings, description and claims.

BRIEF DESCRIPTION OF THE DRAWINGS

FIG. 5 is a plan view of a flow facing side of a noise suppression wedge, according to an embodiment of the present invention;

FIG. 6 is a plan view of a plate facing side of a noise suppression wedge, according to an embodiment of the present invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides noise suppression wedges for butterfly valves, and methods for producing the same. Embodiments of the present invention may find beneficial use in many industries including aerospace, automotive and electricity generation. The present invention may be beneficial in applications including manufacturing and repair of aerospace components. Embodiments of the present invention may be useful in applications including cabin pressure control systems, environmental control systems and auxiliary power units. This invention may be useful in any butterfly valve application, such as but not limited to, butterfly outflow valves for aircraft.

In one embodiment, the present invention provides a noise suppression wedge secured to the surface of the butterfly plate. The wedge can include a plurality of fingers spaced apart by channels. Unlike the prior art that includes an enlarged section of piping immediately downstream of the valve seat, the noise suppression wedge of present invention can be positioned directly on the butterfly plate and can be useful for applications that do not include downstream piping. Unlike the prior art that includes a plurality of tabs secured to the disk, embodiments of the present invention can comprise a noise suppression wedge having a plate facing side that conforms to a portion of the butterfly plate. Embodiments of the present invention can be more easily installed and removed to make application adjustments than can the prior art.

Figure 2:
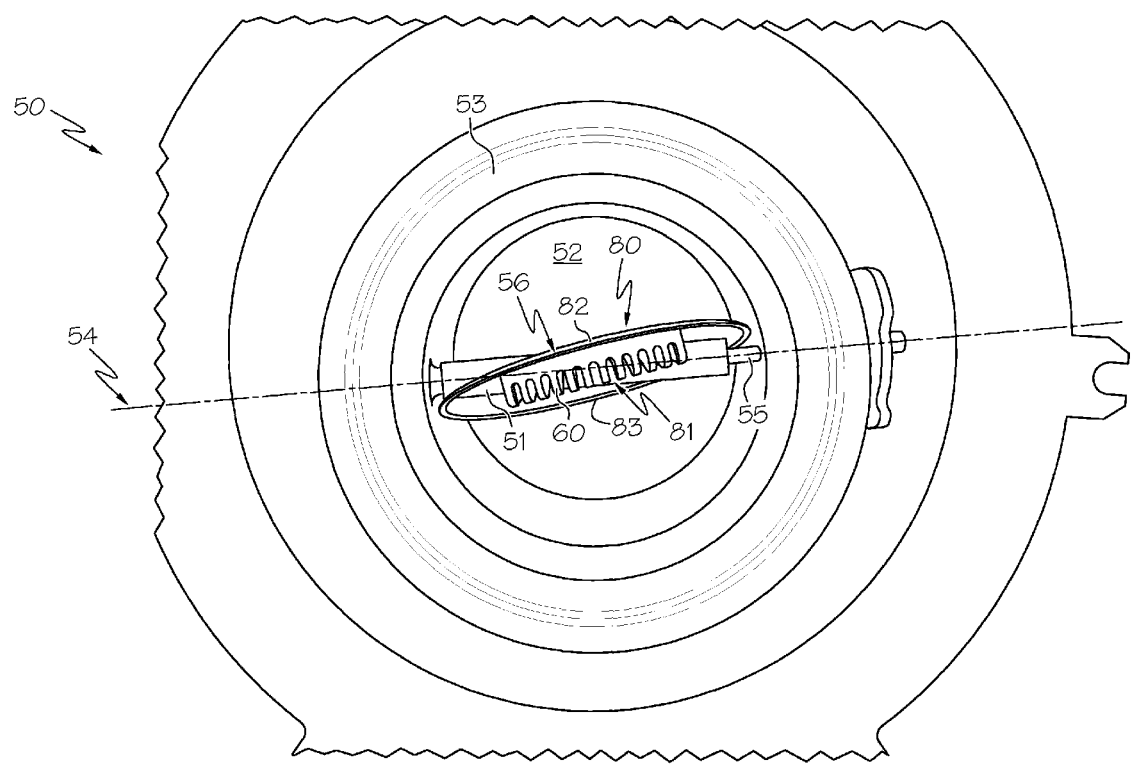
FIG. 2 is a perspective view of a noise suppression wedge installed on a butterfly outflow valve, according to an embodiment of the present invention.

A noise suppression wedge 60 installed on a butterfly outflow valve 50, according to an embodiment of the present invention is shown in FIG. 2. The butterfly outflow valve 50 can comprise a butterfly plate 51 positioned within an opening 52 of a valve body 53. The butterfly plate 51 can be rotated about an axis 54 defined by a valve shaft 55 in order to control a flow of fluid, such as air (not shown) through the opening 52. The butterfly plate 51 may include a ring member 56 and a seal (not shown) to reduce leakage when the butterfly outflow valve 50 is in a closed position.

The butterfly plate 51 may have a downstream side 80, an upstream side 81, a leading edge 82 and a trailing edge 83. The downstream side 80 may be the side of the butterfly plate 51 that faces downstream when the butterfly plate 51 is in a closed position. The upstream side 81 may be the side of the butterfly plate 51 that faces upstream when the butterfly plate 51 is in a closed position. Downstream and upstream may be defined with reference to the flow of fluid. The leading edge 82 may be the upstream edge of the butterfly plate 51 when the butterfly plate 51 is in an open position. The trailing edge 83 may be the downstream edge of the butterfly plate 51 when the butterfly plate 51 is in an open position.

For some applications, the noise suppression wedge 60 may be positioned on the upstream side 81 at the leading edge 82, as depicted in FIG. 2. For some applications, the noise suppression wedge 60 may be positioned on the upstream side 81 at the trailing edge 83. For some applications, the noise suppression wedge 60 may be positioned on the downstream side 80 at the leading edge 82. For some applications, the noise suppression wedge 60 may be positioned on the downstream side 80 at the trailing edge 83. For some applications, one noise suppression wedge 60 may be positioned on the upstream side 81 at the leading edge 82 and another noise suppression wedge 60 may be positioned on the downstream side 80 at the trailing edge 83. For some applications, one noise suppression wedge 60 may be positioned on the upstream side 81 at the trailing edge 83 and another noise suppression wedge 60 may be positioned on the downstream side 80 at the leading edge 82.

Figure 3:
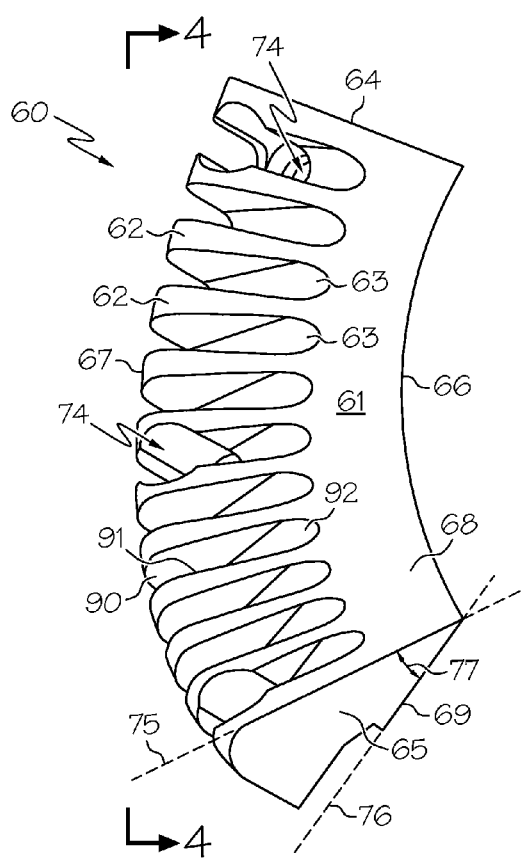
FIG. 3 is a perspective view of a noise suppression wedge, according to an embodiment of the present invention.
Figure 4:
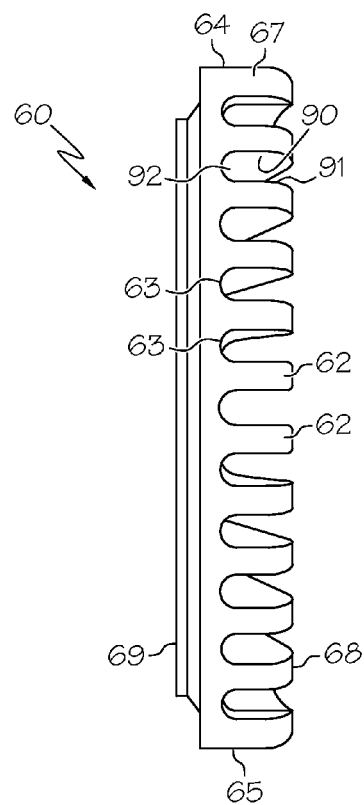
FIG. 4 is a view through line 4-4 of FIG. 3.

The noise suppression wedge 60, as depicted in FIGS. 3 and 4, may comprise an wedge-shaped structure 61 having a plurality of fingers 62 and a plurality of slots 63. The noise suppression wedge 60 may comprise a metal, such as aluminum, or other suitable material. The composition of the noise suppression wedge 60 may depend on the application. For example, for some applications wherein the flow of fluid comprises an exhaust gas flow, a non-corrosive material may be useful. For some aircraft outflow valve applications, the noise suppression wedge 60 may comprise aluminum.

The wedge-shaped structure 61 may have a first end 64, a second end 65, a radially inner edge 66, a radially outer edge 67, a flow facing side 68 and a plate facing side 69.

The first end 64, as depicted in FIGS. 5 and 6, may be parallel to a first radial line 70a. The second end 65 may be parallel to a second radial line 70b. The first radial line 70a and the second radial line 70b each may comprise a radius of the butterfly plate 51. The first radial line 70a and the second radial line 70b may form a structure angle 73. In other words, a line through the first end 64 and a line through the second end 65 may form the structure angle 73. The structure angle 73 may be less than about 180°. The structure angle 73 may vary and may depend on the application, the dimensions of the butterfly plate 51, and the velocity and composition of the flow of fluid. For some aircraft outflow valve applications, the structure angle 73 may be between 70° about and about 105°.

The radially inner edge 66 may be arc-shaped and may be positioned towards an axial line 71 through the opening 52 of a valve body 53. The axial line 71 may be depicted as a point in FIGS. 5 and 6. The radially inner edge 66 may follow the curve of the butterfly plate 51. The radially outer edge 67 may be arc-shaped and may be positioned away from the axial line 71. The radially outer edge 67 may follow the curve of the butterfly plate 51. The length of the wedge-shaped structure 61 along the radially inner and outer edges 66, 67 may be a function of the structure angle 73 and the diameter of the butterfly plate 51.

A radial length 72, as depicted in FIGS. 5 and 6, of the wedge-shaped structure 61 may be the distance between the radially inner edge 66 and the radially outer edge 67. For some embodiments, the radial length 72 of the wedge-shaped structure 61 may less than about one half the radius of the butterfly plate 51. For example, for a butterfly plate 51 having a diameter of 4.5 inches, the radial length 72 of the wedge-shaped structure 61 may be about 0.75 inches. For some aircraft outflow valve applications, the radial length 72 may be between about 0.5 inches and about 1.0 inches. For some applications, the length of the radially outer edge 67 may be between about 2.6 inches and about 3.8 inches.

The flow facing side 68, as depicted in FIG. 5, may comprise the side of the wedge-shaped structure 61 that faces towards the flow of fluid (e.g. flow of air). The fingers 62 and the slots 63 (discussed below) may be in contact with the flow facing side 68. The flow facing side 68 may rounded at the radially outer edge 67 to maintain valve clearance.

The plate facing side 69, as depicted in FIG. 6, may comprise the side of the wedge-shaped structure 61 that faces towards the butterfly plate 51. In some embodiments, the plate facing side 69 may be designed to conform to a portion of the surface of the butterfly plate 51. For these embodiments, the wedge-shaped structure 61 may include at least one hole 74. The hole 74 may extend from the flow facing side 68 to the plate facing side 69. The hole 74, along with a rivet (not shown) or a screw (not shown), may be used to secure the wedge-shaped structure 61 to the butterfly plate 51. For some embodiments wherein the plate facing side 69 follows the contours of at least a portion of the surface of the butterfly plate 51, the plate facing side 69 may be designed to be secured to the butterfly plate 51 by other methods, such as by welding or brazing. In alternate embodiments, the plate facing side 69 may be integral to the butterfly plate 51.

Figure 7:
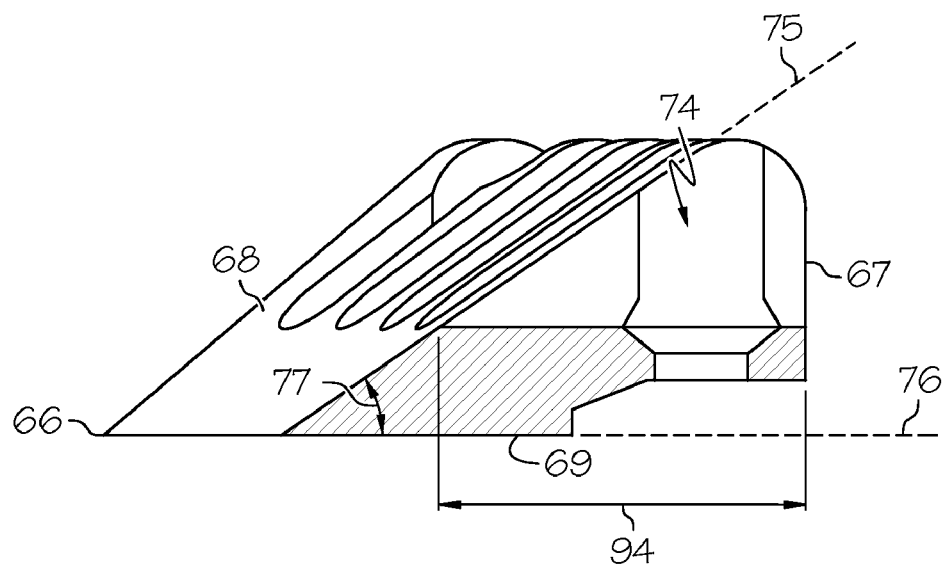
FIG. 7 is a view through line 7-7 of FIG. 6.

As depicted in FIGS. 3 and 7, a flow-side line 75 and a plate-side line 76 may form a wedge angle 77. The flow-side line 75 may be a line through the flow facing side 68. The plate-side line 76 may be a line through the plate facing side 69. In other words, the flow facing side 68 and the plate facing side 69 may be positioned, relative to one another, in such a way as to form the wedge angle 77. The wedge angle 77 may vary and may depend on the application. The wedge angle 77 may depend on factors including the clearance requirements of the valve body 53, the velocity of the flow through the opening 52 and the dimensions of the butterfly plate 51. The wedge angle 77 may be designed such that the noise suppression wedge 60 does not interfer with the rotation of the butterfly plate 51. The wedge angle 77 may be designed such that butterfly plate clearance is maintained. For some aircraft outflow valve applications, the wedge angle 77 may be between 34° about and about 45°.

The wedge-shaped structure 61 may include at least one finger 62 and at least one slot 63, as depicted in FIGS. 3 and 4. The finger 62 may extend from the flow facing side 68 towards the plate facing side 69 and extend between two adjacent slots 63. The finger 62 may be formed by two adjacent slots 63. The finger 62 may be parallel to a radius of the butterfly plate 51. For some embodiments, a plurality of fingers 62 may be positioned such that the fingers 62 are parallel to each other. Alternatively, as depicted in FIG. 5, the fingers 62 each may be parallel to a radius of the butterfly plate 51.

The number of fingers 62 may vary with application and may depend on factors including the diameter of the butterfly plate 51 and the structure angle 73. For some aircraft outflow valve applications, there may be between about 12 and about 18 fingers 62. For some applications, there may be at least about 12 fingers 62. The density of fingers 62 also may vary with application. The density of the fingers 62 may be defined as the number of fingers 62 per unit length of the radially outer edge 67. For some aircraft outflow valve applications, the density of the fingers 62 may be between about 0.21 and about 0.25 fingers 62 per inch.

The slot 63 may extend from the flow facing side 68 towards the plate facing side 69 and extend between two adjacent fingers 62. The slot 63 may include a first slot side 90 and a second slot side 91 and a bottom side 92, as depicted in FIGS. 3 and 4. For ease of manufacture, the first slot side 90 may be parallel to the second slot side 91. For some applications, the slot bottom 92 may be parallel to the butterfly plate 51. A slot width 93 (see FIG. 5) may vary with application and may depend on factors including the desired number of fingers 61, the dimensions of the butterfly plate 51 and the structure angle 73. For example, for some aircraft outflow valve applications having a butterfly plate diameter of about 4.5 inches and a structure angle of 72°, the slot width 93 may be about 0.12 inches. Although the slot width 93 may vary, for some applications the slot width 93 may be between about 0.115 inches and about 0.135 inches. A slot length 94 (see FIG. 7) may be less than the radial length 72. The slot length may vary with application and may depend on factors including the wedge angle 77 and the dimensions of the butterfly plate 51. For example, for some aircraft outflow valve applications having a butterfly plate diameter of about 4.5 inches and wedge angle of 45°, the slot length 94 may be about 0.430 inches. The number of slots 63 may vary with application and may depend on factors including the diameter of the butterfly plate 51 and the structure angle 73. For some aircraft outflow valve applications, there may be between about 11 and about 17 slots 63. The slots 63 may be formed by conventional machining techniques or casting methods.

During valve operation, the noise suppression wedge 60 may disrupt the flow and cause turbulence. This turbulence may result in noise suppression.

Figure 8:
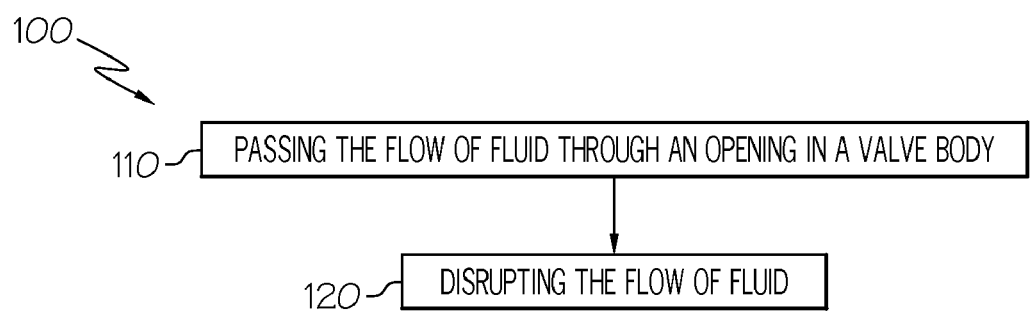
FIG. 8 is a flow chart of a method of controlling a flow of fluid according to an embodiment of the present invention.

A method 100 of controlling a flow of fluid, such as air, is depicted in FIG. 8. The method 100 may comprise a step 110 of passing the flow of fluid through an opening 52 in a valve body 53 and a step 120 of disrupting the flow of fluid. The step 110 of passing the flow of fluid through an opening 52 in a valve body 53 can comprise rotating a butterfly plate 51 positioned within the valve body 53. The step 120 of disrupting the flow of fluid can comprise passing the flow of fluid in contact with a noise suppression wedge 60 positioned on the upstream side 81 at the leading edge 82 the butterfly plate 51. The step 120 of disrupting the flow of fluid can comprise passing the flow of fluid in contact with a noise suppression wedge 60 positioned on the upstream side 81 at the trailing edge 83 of the butterfly plate 51. The step 120 of disrupting the flow of fluid can comprise passing the flow of fluid in contact with a noise suppression wedge 60 positioned on the downstream side 80 at the leading edge 82 of the butterfly plate 51. The step 120 of disrupting the flow of fluid can comprise passing the flow of fluid in contact with a first noise suppression wedge 60 positioned on the upstream side 81 of the butterfly plate 51 and in contact with a second noise suppression wedge 60 positioned on the downstream side 80 of the butterfly plate 51.

EXAMPLE 1

Figure 1:
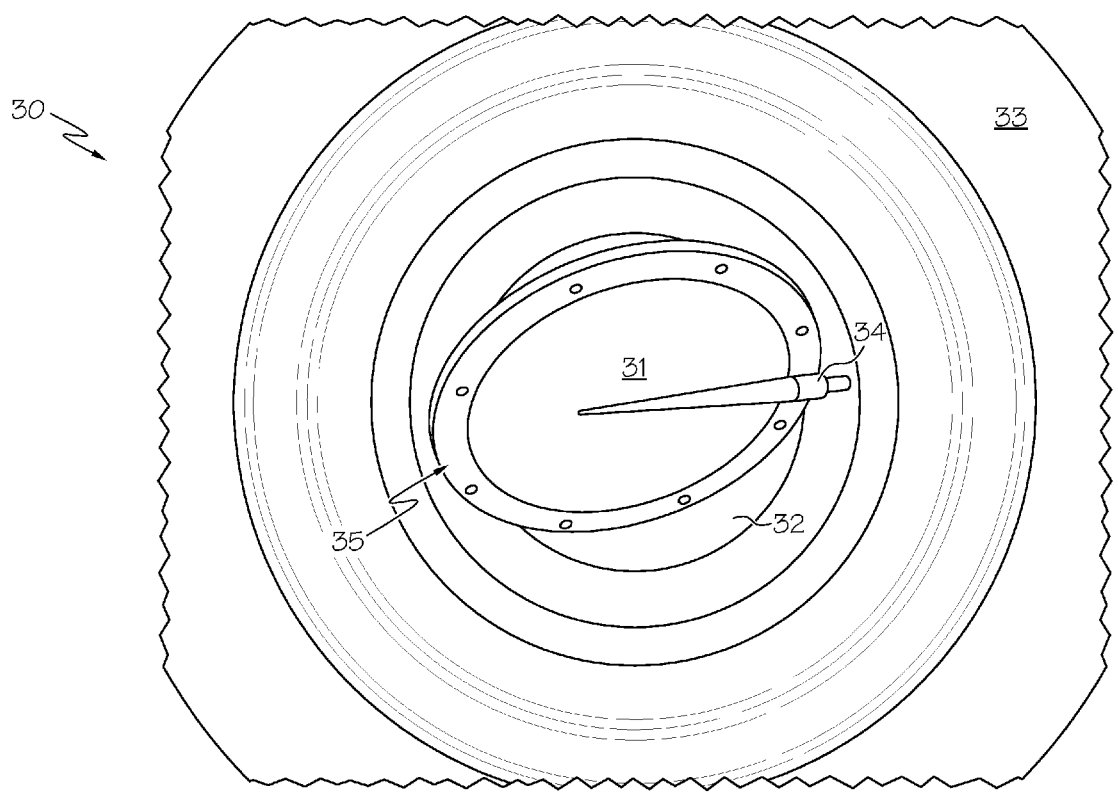
FIG. 1 is a perspective view of a prior art butterfly valve.
Figure 9:
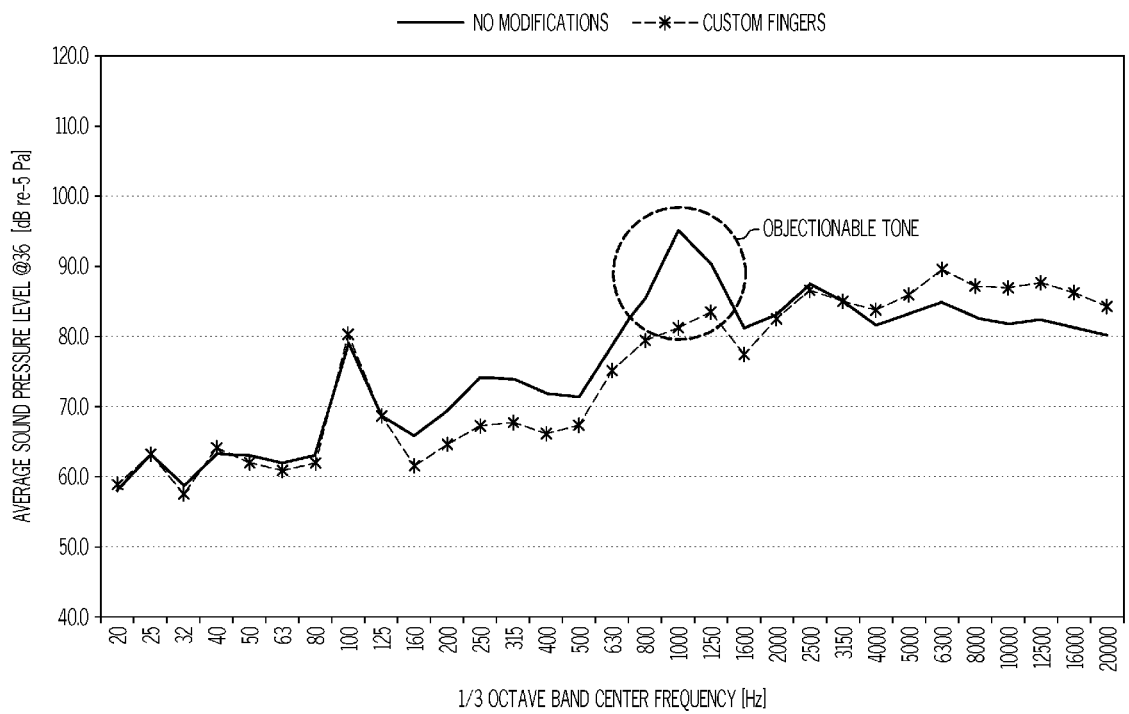
FIG. 9 is a plot of average sound pressure level as a function of frequency according to one embodiment of the present invention.

A prior art butterfly valve and a present invention butterfly valve including a noise suppression wedge were compared. The prior art butterfly valve, as depicted in FIG. 1, was a 4.5-inch valve. The present invention butterfly valve, as depicted in FIG. 2, was a 4.5-inch valve with a noise suppression wedge secured to the leading edge of the upstream side of the butterfly plate. The noise suppression wedge had eleven slots 63 and a wedge angle 77 of 45°. Noise testing was conducted and the results are shown in FIG. 9. As can be seen, the noise suppression wedge reduced the noise characterized by a tone near 1000 Hz.

As can be appreciated by those skilled in the art, the present invention provides improved butterfly valves. Embodiments of the present invention can disrupt the flow, reducing the noise caused by the flow. Embodiments of the present invention can comprise wedge-shaped structures that are easy to install and remove for application adjustments.

It should be understood, of course, that the foregoing relates to exemplary embodiments of the invention and that modifications may be made without departing from the spirit and scope of the invention as set forth in the following claims.

We claim:

1. An apparatus comprising:
    a butterfly plate having a surface, a portion of the surface having a non-flat surface contour;
    a wedge-shaped structure secured to the surface of the butterfly plate, the wedge-shaped structure having a flow facing side and a plate facing side that meet at a radially inner edge of the wedge-shaped structure to form an acute wedge angle between the flow facing side and the plate facing side at the radially inner edge, said plate facing side conforming to at least a portion of the non-flat surface contour of the surface of said butterfly plate, and said radially inner edge being a surface edge of the plate facing side; and
    at least one slot extending from said flow facing side of the wedge-shaped structure and extending towards said plate facing side.

2. The apparatus of claim 1, wherein said slot is parallel to a radius of said butterfly plate.

3. The apparatus of claim 1, further comprising a plurality of fingers in said flow facing side.

4. The apparatus of claim 1, wherein said butterfly plate comprises a butterfly plate for an aircraft outflow valve.

5. The apparatus of claim 1, wherein said slot has a slot width of between about 0.115 inches and about 0.135 inches.

6. The apparatus of claim 1, wherein said acute wedge angle is between about 34° and about 45°.

7. The apparatus of claim 1, wherein said wedge-shaped structure has a radial length of between about 0.5 inches and about 1.0 inches.

8. The apparatus of claim 1, wherein a radially outer edge of said wedge-shaped structure is arc-shaped.

9. The apparatus of claim 1, wherein said wedge-shaped structure has a first end and a second end, said first end and said second end form a structure angle between 70° about and about 100°.

10. The apparatus of claim 1, further comprising at least one hole extending from said flow facing side to said plate facing side.

* * * * *